United States Patent
Monnier et al.

(10) Patent No.: US 11,454,735 B2
(45) Date of Patent: Sep. 27, 2022

(54) METHOD AND A SYSTEM FOR DETECTING A POTENTIAL THREAT IN A SHOE WORN BY AN INDIVIDUAL

(71) Applicant: SEDECT SA, Gland (CH)

(72) Inventors: Frédéric Monnier, Cortaillod (CH); Marc Lany, Rolle (CH); Luis Filipe Soldado Granadeiro Rosado, Lisboa (CH); Gilles Santi, Lausanne (CH); Bernard Revaz, Geneva (CH); Alain Berthoud, Châtelaine (CH)

(73) Assignee: Sedect SA, Gland (CH)

( * ) Notice: Subject to any disclaimer, the term of this patent is extended or adjusted under 35 U.S.C. 154(b) by 32 days.

(21) Appl. No.: 16/765,141

(22) PCT Filed: Nov. 21, 2018

(86) PCT No.: PCT/IB2018/059173
§ 371 (c)(1),
(2) Date: May 18, 2020

(87) PCT Pub. No.: WO2019/102368
PCT Pub. Date: May 31, 2019

(65) Prior Publication Data
US 2020/0348435 A1    Nov. 5, 2020

(30) Foreign Application Priority Data
Nov. 21, 2017   (CH) ................................. CH01410/17

(51) Int. Cl.
*G01V 3/08*     (2006.01)
*G08B 5/36*     (2006.01)
*G06K 9/00*     (2022.01)

(52) U.S. Cl.
CPC ........... *G01V 3/08* (2013.01); *G06K 9/00536* (2013.01); *G08B 5/36* (2013.01); *G06V 2201/05* (2022.01)

(58) Field of Classification Search
CPC .. G01V 3/08; G06K 9/00536; G06K 2209/09; G08B 5/36
See application file for complete search history.

(56) References Cited

U.S. PATENT DOCUMENTS 5,680,103 A    10/1997  Turner et al.
7,053,785 B2    5/2006  Akins
(Continued)

FOREIGN PATENT DOCUMENTS

WO    WO-2011/063059 A1    5/2011

OTHER PUBLICATIONS

International Search Report & Written Opinion for PCT/IB2018/059173, dated Apr. 2, 2019, 13 pages.
(Continued)

*Primary Examiner* — Hongmin Fan
(74) *Attorney, Agent, or Firm* — Blank Rome LLP

(57) ABSTRACT

The invention concerns a method and a system (1) for detecting a threat in a shoe (21, 22) worn by an individual (2) accessing a restricted access area (50) through a security access point (51). The method comprises obtaining a first response provided by a first metal detector (11) by sensing a pair of shoes worn by the individual. The first response is compared with a signature signal representing a shoe comprising a threat or an object representing a threat so to indicate a critical pair of shoes. In such case, the method further comprises prompting the individual to place the critical pair of shoes at a predefined position to obtain a second response provided by the first or by a second metal detector (12, 13) by sensing one shoe of said critical pair of
(Continued)

shoes. A potential threat is detected by comparing the second response with the signature signal.

20 Claims, 2 Drawing Sheets

(56) References Cited

U.S. PATENT DOCUMENTS

| | | | |
|---|---|---|---|
| 8,424,365 B2 | 4/2013 | Crowley et al. | |
| 2004/0098237 A1 | 5/2004 | Pendergraft et al. | |
| 2004/0178789 A1* | 9/2004 | Candelore, III | G01V 3/08 |
| | | | 324/226 |
| 2004/0222790 A1* | 11/2004 | Karmi | G01R 33/441 |
| | | | 324/300 |
| 2005/0146441 A1 | 7/2005 | Akins | |
| 2011/0129063 A1* | 6/2011 | Bendahan | G01V 5/0016 |
| | | | 378/57 |
| 2011/0185474 A1* | 8/2011 | Helenihi | A41B 11/123 |
| | | | 2/239 |
| 2012/0148020 A1* | 6/2012 | Arroyo, Jr. | G01V 3/165 |
| | | | 378/57 |
| 2015/0035521 A1 | 2/2015 | Manneschi | |
| 2016/0232769 A1* | 8/2016 | Jarvi | G07C 9/22 |

OTHER PUBLICATIONS

Wikipedia, "Datei: Flughafenkontrolle.jpg", https://de.wikipedia.org/wiki/Datei:Flughafenkontrolle.jpg 2019, 5 pgs.

\* cited by examiner

METHOD AND A SYSTEM FOR DETECTING A POTENTIAL THREAT IN A SHOE WORN BY AN INDIVIDUAL

RELATED APPLICATIONS

This application is a national phase of PCT/IB2018/059173, filed on Nov. 21, 2018, which claims priority to Swiss Application No. CH01410/17, filed on Nov. 21, 2017. The entire contents of these applications are hereby incorporated by reference.

FIELD OF THE INVENTION

The present invention concerns a system and a method for detecting a potential threat in a shoe worn by an individual before entry to a restricted access area, notably a passenger before entering a restricted area of an airport, bus station, train station, building, etc.

DESCRIPTION OF RELATED ART

The prevention of accidental and malicious harms and the repression of illegal and criminal acts often imply a creation of restricted access areas in sensitive facilities and buildings, such as in airports, for protecting users, staff and vehicles from accidental and malicious harms.

The restricted access areas are provided with one or more security access points provided with security scanning systems for scanning persons wanting to access the restricted area as well as for scanning carried objects.

In order to scan all the persons entering such a restricted area, it is common to provide an access path that forces all persons to go through a pass-through passage provided with a metal detector, generally in form of a security portal with a metal detector scanning the entire body of the individual (full-body metal detector). If metal is detected, a further body scan is performed manually or with a full-body scanner, i.e. a device configured to scan the entire body of an individual by means of a screening technique harmless to human and without asking the individual to remove clothes and without physical contact (e.g. millimetre-wave imaging). The screening process provided by today's body scanners is generally static, i.e. the individual must stand still during a scan. The restricted area of transporter facilities are also generally equipped with baggage screening systems, i.e. potentially harmful system providing a more efficient and efficacy scan of carried objects (e.g. X-ray inspection system).

It is known that, even though shoes and footwear can provide hiding places for carrying dangerous and illegal objects, shoes frequently incorporate unarm metal parts, such as reinforcements, that create false positive results. When metal is detected in shoes, the person is often required to remove his shoes, put them in a tray on a conveyor of the baggage screening system, and go through the portal a second time without his shoes. This move back to the conveyor creates a non-laminar flow of persons in the queue and dramatically increases the waiting time for the next persons.

In order to avoid this need for double scanning of some passengers, some airports require all passengers to remove their shoes and put them in a tray in advance. However, the shoe removal process causes great inconvenience and further delays in the queue.

In order to address this problem, US2011/0129063 discloses an X-ray inspection system for shoes operating within a whole body-scanner. This system eliminates the need for the persons to remove their shoes. However, this system requires an operator to analyse the images of the shoes. Moreover, X-Ray scanning all passengers exposes them to ionizing radiation which is undesirable for health reasons.

It would thus be desirable to detect before the security access point those persons who have metal parts in their shoes so as to reduce the delays created by a person who needs to go back for removing theirs shoes.

US2004/0222790 discloses a detector sensing threat material in shoes of an individual approaching a security portal. The detector performs its measurements and provides one or more indications on an output device. For example, such an indication may be visual in the form of a light: green for no threat, red upon threat detection and yellow when results are inconclusive and the measurement must be repeated.

However, the detector is sensitive to cumulative sensing of multiple unarm metallic objects within the pair of shoes, leading thus to additional delays due to repetitive scans of the same pair of shoes and to perform manual inspections of unarm shoe dues to false positive detections.

U.S. Pat. No. 7,053,785 discloses a pre-screening device configured to scan a single shoe of an individual approaching to a security portal. The device requires the user to sequentially place their shoes, one after the other, in a compartment of the pre-screening device.

However, this scanning requires a precisely and artificial positioning of each shoe in the compartment of the device that lead, not only to an additional delay for all persons waiting in the queue, but also to a discomfort for some individuals having limited movements and/or coordination of movements.

BRIEF SUMMARY OF THE INVENTION

The aim of the invention is to provide a method and a system for detecting a potential threat within a shoe of an individual devoid of, or at least attenuating, the disadvantages of the prior art.

A particular aim is to provide a method and a system for detecting a threat in a shoe worn by an individual in a queue in a non-obstructive way, and with minimal or no delay.

According to the invention, these aims are achieved by means of the method of claim 1 and the system of claim 15. Dependent claims describe particular advantageous embodiments of the proposed solution.

The proposed method and system permit a more rapid flow of individual through a security access point of a restricted access area, while maintaining an efficacy detection of threat.

In fact, the proposed solution requires neither a systematic scan of each shoes worn by individual wanting to access the restricted area, nor a comeback of individuals wearing critical shoes through the security access point for removing theirs shoes so as to pass through the security portal a second time.

The proposed solution provides an early assessment of pairs of shoes potentially representing a threat (i.e. critical pair of shoes) without generating an additional delay within individuals in the queue. This early assessment is based on a comparison of the first response provided by the first metal detector by sensing the pair of shoes worn by the individual standing on or walking through the security access point. This scan is performed without causing additional delay or discomforts. Then, shoes of critical pairs are individually scanned for detecting a threat, so as to reduce the number of individual having to stop and to wait for carrying out the individual scanning. This solution speed up the flow of individuals wearing uncritical pair of shoes as they haven't to wait for scanning their shoes, while also reducing the queue of individuals having to undergo the single-shoe scan.

The comparison of the (first) response provided by sensing a pair of shoes and then the (second) response provided by sensing one shoe of the pair with the same signature signal, representing or simulating a shoe comprising a threat, permit not only to reduce the number of shoes reputed as critical (i.e. that need to be individually scan) but also to provide a cost-effective solution.

In fact, this comparison permit to early select the pair of shoes where a shoe of each pair of shoes that either comprises a potential threat or could comprise a potential threat (e.g. when metals in the both shoes are cumulatively sensed as a single potential threat). The second response permits to robustly assess the potential threat (i.e. provides a reduction of false positive detections) by detecting those pairs of shoes where a shoe comprises a potential threat, thus releasing those pairs whose both shoes comprise unharmed metal being falsely sensed as a single potential threat.

Moreover, the proposed solution permits a use of the same metal detector for obtaining the first, the second and eventually the third response. The proposed solution also permits a use of two or three similar metal detectors for obtaining the first, the second and the third response.

In a particular embodiment, the method and the system further involve a pre-scanning of the pair of shoes on a path leading to the security access point.

This pre-scanning permits a detection (or assumption) of a potential threat in shoes of individuals early in the queue of individual, so that an individual wearing can be prompted to remove his shoes and to scan them by means of the baggage screening system of the security access. This particular embodiment provides a rapid and robust scan of potential critical shoes, i.e. before to pass through the security access point for the first time.

Moreover, the proposed solution is compatible with existing access paths and security portals of facilities and buildings, without requiring complex and bulky installations. In particular, the proposed solution permits an integration with and/or a use of already existing detectors of security access points (e.g. baggage screening system) of facilities and buildings, avoiding redundancy and additional costs.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
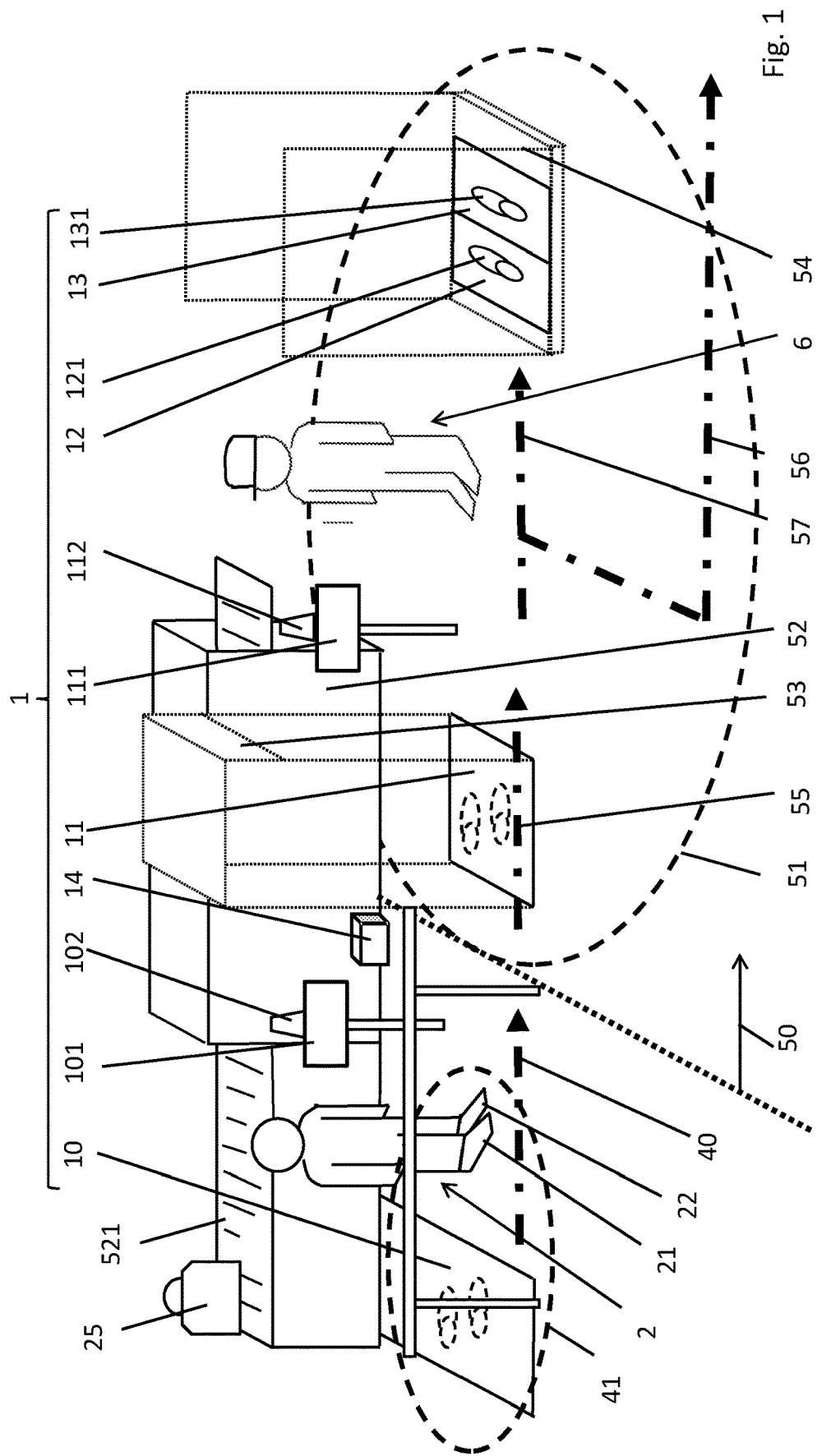
FIG. 1 shows a view of an exemplary system for detecting a potential threat within a shoe of an individual wanting to access a restricted access area through a security access point, according to the invention.

FIG. 1 show an exemplary embodiment of a system 1 configured to detect a potential threat in a shoe of the pair of shoes 21,22 worn by an individual 2 accessing a restricted access area 50 through the security access point 51.

The system 1 is configured to detecting a threat in the right shoe 21 and/or the left shoe 22 worn by this individual by:
obtaining a first response provided by a first metal detector 11 by sensing the pair of shoes 21, 22 worn by the individual 2 standing on or walking through the security access point 51;
comparing this first response with a signature signal and, based on the comparison:
   obtaining a second response provided by this first metal detector 11 or by a second metal detector 12 by sensing one shoe of said pair of shoes (e.g. either the left shoe 22 or the right shoe 21); and
   detecting a potential threat by comparing the second response with the same signature signal.

In case the comparing of the second response with the same signature signal is inconclusive for detecting a potential threat, the system 1 can be configured to:
obtaining a third response provided by this first metal detector 11, this second metal detector 12 or by a third metal detector 13, by sensing the other one shoe of said pair of shoes (e.g. the other of the left shoe 22 and the right shoe 21 being selected for the second response); and
detecting a potential threat by comparing this third response with the same signature signal.

Advantageously, the system 1 can be configured to detecting a threat in the right shoe 21 and/or the left shoe 22 by comparing this second response with this third response. This comparison can actually provide an assessment of a similitude (i.e. a symmetry) between the second response with the third response indicating a likely presence of similar metallic parts or objects in both shoes of the pair.

Preferably, the system 1 is configured so as to obtain the second and/or third response while the shoe to be scanned is still worn by the individual, so as to avoid an additional delay for removing the shoe.

As a potential threat for a given restricted area can arise from one or more distinct threats (e.g. in reason of unhallowed objects, material and/or liquids an individual is not allowed to wear or to carry for accessing the restricted area), the signature signal can be part of a set of distinct signature signals, preferably each signature signal representing a distinct threat of a set of given threats.

The signature signal (or each of the set of signature signals) can be defined and/or obtained by sensing with a metal detector and/or by simulating on a metal detector:
   an object representing a threat;
   a shoe comprising a threat (e.g. in form of an object, a material and/or a liquid).

The metal detector used for defining and/or obtaining the signature signal can be one of the metal detectors of the system (i.e. the first, the second or the third metal detector) or another metal detector with predefined and/or known sensing parameters.

The comparison of the first response with this signature signal permits to early select the pair of shoes where:
a shoe comprises a potential threat, i.e. the shoe comprises either a threat or metals being cumulatively sensed as a threat;
or both shoes comprise metals being cumulatively sensed as a threat.

The comparison of the second and/or third response with this same signature signal permits to robustly assess the potential threat by detecting those pairs of shoes where a shoe comprises a potential threat and by releasing those pairs wherein both shoes comprise unharmed metal being cumulatively sensed as a (false) single potential threat.

The response of a metal detector can be a scalar value, a set of scalar values and/or a multi-dimensional vector representing one or more physical properties and/or one or more relative positions of metal sensed by the metal detector. The scalar value(s) can be a real and/or a complex scalar value(s). The response can comprise or represent one or more spatial dimensions. The response can comprise or represent a temporal dimension.

The metal detector can comprise a single sensor or a plurality (i.e. a mono-dimensional, two-dimensional and/or a three-dimensional array) of sensors sensible to electromagnetic fields.

The signature signal can comprises a scalar value, a set of scalar values and/or a multi-dimensional vector representing one or more physical properties and/or one or more relative positions of a threat being measurable (i.e. being sensed) by a metal detector when sensing this threat in a statically relative position and/or along a dynamically path with respect to the metal detector. The signature signal can comprise or represent one or more spatial dimensions. The signature signal can comprise or represent a temporal dimension.

The signature signal can be based on a representation of the physical property(ies) and/or relative position(s) that is the same as the representation used for the responses signals provided by the metal detector, or that permits the comparison with the responses provided by the metal detectors.

The physical property can be, for example, a volume, a mass, a shape, or a material of the threat, or a combination thereof. The relative position can be an orientation, a spatial positioning or a path with respect to the metal detector, or a combination thereof.

The system 1 can be also configured to pre-scanning the pair of shoes on a path 40 leading to the security access point 51; notably by:

obtaining a preliminary response provided by a preliminary metal detector 10 by sensing the pair of shoes, and by comparing the preliminary response with a preliminary signature signal.

The preliminary signature signal can be part of a set of distinct preliminary signature signals, preferably each preliminary signature signal representing a distinct threat. Advantageously, the threat or the set of threats corresponds to those used for defining and/or obtaining the signature signal and the set of signature signals used with the first, second and/or third response.

The preliminary signature signal (or each of the set of preliminary signature signals) can be defined and/or obtained by sensing with a metal detector and/or by simulating on a metal detector:

two objects, each representing a threat;

a pair of shoes wherein each shoe comprising the same or a distinct threat.

The comparison of the preliminary response with this preliminary signature signal permits to select the pairs of shoes wherein a potential threat would be likely be detected later in the security access point by comparing the second and/or the third response.

As used herein, the term "comparing" encompasses a wide variety of actions. For example, "comparing" may include finding and/or computing and/or measuring differences, matching, extracting one or more thresholds (e.g. from the signature signal), applying one or more thresholds (e.g. to the response signal), classifying (e.g. based on the set of signature signals), and a combination thereof.

Several classification systems are available and can be applied to the problem of comparing the response signal with the signature signal including, for example an automatic learning system that could be based, according to the use cases on a neural network, a network of support vector machines, or an hidden Markov model. This is not the sole implementation of the invention, however, and the comparison could be based on simpler automatic means or on the judgment of a human operator.

The exemplary embodiment of system 1 illustrated in FIG. 1, the first metal detector 11 is configured to provide the first response.

The first metal detector 11 is configured to conjointly scan the pair of shoes (i.e. the right shoe 21 and the left shoe 22) worn by the individual 2 when standing or walking on the security access point 51. Conjointly scanning means that the first metal detector 11 senses metal indiscriminately located in one or more shoes of the pair of shoes. The provided response is thus affected by (the total amount of) metals of (or located in) the left and in the right shoes.

The first metal detector 11 is advantageously located on a path 55 the individual has to wait or walking for accessing the restricted access area trough of the security access point 51. Placing the first metal detector under a surface of a passing-trough passage 53 of the security access point 51 permit to rapidly scan the pair of shoes without creating obstacles and discomforts, notably in individuals having limited movements and/or coordination of movements.

Moreover, the first metal detector 11 can be configured to operate above or on a surface of a pass-through full-body metal detector 53. The first metal detector 11 can thus be located below this surface and/or integrated in the full-body metal detector 53. Alternatively, the first metal detector 11 can be located within a casing placed on this surface of the full-body metal detector 53, wherein the casing is also provided with a surface onto which an individual can walk. This configuration guarantees a systematically scan of all individuals wearing shoes and attending the security access point, without additional actions.

In the exemplary embodiment of system 1, the second and the third response are provided by another, spatially distinct metal detector unit comprising and/or combining a second and a third metal detector 12,13.

Each of second and a third metal detectors is configured to scan a single shoe of the pair of shoes when positioned at a predefined position with respect to the metal detector 12, 13. A detection of metal located uniquely in a single shoe can be performed by sensing metal within a given shaped and/or dimensioned volume above the predefined position. The predefined position can be a portion of a surface on which the individual can stand, notably indicated by a mark (e.g. a circle, a cross or a footprint 121, 131), on which the shoe has to be placed for the scan.

The second and a third metal detectors can also comprise a recess, a cavity, and/or a compartment for indicating, eventually forcing, a precise positioning of the shoe to be scanned.

This configuration permits to space the location where the first response is obtained away from the location where the second and third response are obtained. This leads to a spatial separation of the flow of individual wearing uncritical shoes from the flow of the others ones. This separation reduces the delay for individuals passing through the security access point 51, notably by letting individual worn uncritical pair of shoes to further progress in security check by taking a way 54 away from the direct way 57 to the second and third metal detector. The use of two metal detectors for individually providing the second and the third response permits to parallelize the obtaining of these responses, further reducing the time spent in detecting a potential threat.

Moreover, this configuration permits a use of two or three similar metal detectors, i.e. metal detectors having the same electronical circuits and same sensing parameters. The first, second and third metal detector of the embodiment of FIG. 1 differentiate themselves only by providing and/or indicating (e.g. by means of one or more marks) a surface onto which individual can or has to place either both or a single shoe.

In the exemplary embodiment of the FIG. 1, the second and the third metal are spatially positioned one adjacent the other so as to permit the individual to precisely and simultaneously placing his shoes at the predefined position of each metal detector. Each metal detection is provided with a mark 121, 131 for indicating this predefined positioning for each shoe for the scan.

The second and third metal detector 12,13 is advantageously located on a path 57 within the security access point that is accessible from the location of the first metal detector, i.e. on a way toward the restricted access area and spatially following the passing-trough passage 53, without to come back through the security access point. This relative positioning of the first, the second and the third metal detectors permits to detect a potential threat without requiring a comeback of individual through the security access point 51.

In the exemplary embodiment of FIG. 1, the second and the third metal detector 12,13 are configured to operate above or on a surface of a full-body scanner 54. The second and the third metal detectors 12,13 can thus be located below this surface and/or integrated in the full-body scanner 54. Alternatively, the second and the third metal detector 12,13 can be located within a common or distinct casing placed on this surface of the full-body metal detector 53, wherein the casing is provided with a surface onto which an individual can walk.

This configuration permits to perform the shoes scan while the individual has to stand motionless for performing a body scan.

The illustrated system 1 also comprises a preliminary metal detector 10 for providing the preliminary response. The illustrated pre-scan metal detector 10 is in form of an underfloor or Carpet-type metal detector that is located on the path 40 leading to the security access point 51, so as to detecting an early potential threat of shoes worn by an individual approaching the security access point 51.

Preferably, the preliminary metal detector 10 is located at, or in proximity, to a location where the individuals are asked to place theirs carried objects (such as baggage 25, portable electronic devices and jackets) on a conveyor 521 of a baggage screening system 52 for scanning.

This particular configuration permits, in case the comparison of the preliminary result with the preliminary signature signal likely indicates one or more potential threats, to immediately prompt the individual worn this pair of shoes to remove theirs shoes and to place them onto the conveyor 521 of the baggage screening system 52. This pre-scan permits to process such critical pairs of shoes (wherein a potential threat would be likely be detected by comparing the second and/or the third response) before the first passage through the security access point, speeding up the flow of individuals through a security access point.

The system 1 also comprises an indication arrangement 101, 102,111,112 for providing instructions to the individual 2, directly or through an assistant 6; and a processing system 14 configured to receive and/or perform detection based on the responses provided by the first, the second and the third metal detector and to control the indication arrangement. Preferably, the processing system 14 is also configured to receive and/or perform an indication of a presence of a threat based on the preliminary response provided by preliminary metal detector.

The processing system 14 can be a single processing unit. This single processing unit can be a remotely located unit, or a processing unit of the indication arrangement, or a processing unit of one of the metal detector of the system 1.

Alternatively, the processing system 14 can be in form of a distributed processing system. The distributed processing system can comprise one or more standalone processing elements, one or more processing units of the indication arrangement and/or of the metal detectors.

In particular, the processing system 14 can be configured to control a display 111 and a multi-colour light 112 of the indication arrangement, based on (an outcome of) the comparison between the first response and the signature signal, for:

in case the comparison indicates a critical pair of shoes, prompting the individual 2 to move to (a location of) the second and third metal detector 12, 13 in order to carry out the individually scan of his right shoe 21 and his left shoe 22;

in case the comparison indicate a uncritical pair of shoes, allowing the individual 2 to take an exit path 56 circumventing or bypassing the (location of) second and third metal detector.

An individual can be prompt to move to the second metal detector 12, 13 by displaying a warning message with or without a displaying of a coloured luminous signal, e.g. a Yellow/Orange light.

Similarly, an individual can be prompt to pass through the security access path by circumventing or bypassing the second metal detector by displaying a go message with and/or without a displaying of a coloured luminous signal, e.g. a green light.

In case the comparison indicate a critical pair and the other security parameters are meet (e.g. no other threats are detected or supposed due to elements carried or located on or in other part of his body), the processing system 14 can control the indication arrangement for even letting (prompting) the individual to pass through the security access point 51 so as to access the restricted access area 50.

Advantageously, the processing unit 14 is also configured to control a display unit 101 and/or a multicolour light 102 of the indication arrangement, based on (an outcome of) the comparison between the preliminary response and the preliminary signature signal, for:

in case the comparison indicate a critical pair of shoes, prompting the individual to remove his right and left shoes (21, 22) and to place them onto a dedicated detection system, notably in form of the baggage screening system 52;

in case the comparison indicate a uncritical pair of shoes, to allow or prompt the individual to go to the security access point.

An individual can be prompt to remove his shoes by displaying a remove message with or without a displaying of a coloured luminous signal, e.g. a Red light.

Similarly, an individual can be prompt to go to the security access point by displaying a go message with or without a displaying of a coloured luminous signal, e.g. a green light.

Figure 2:
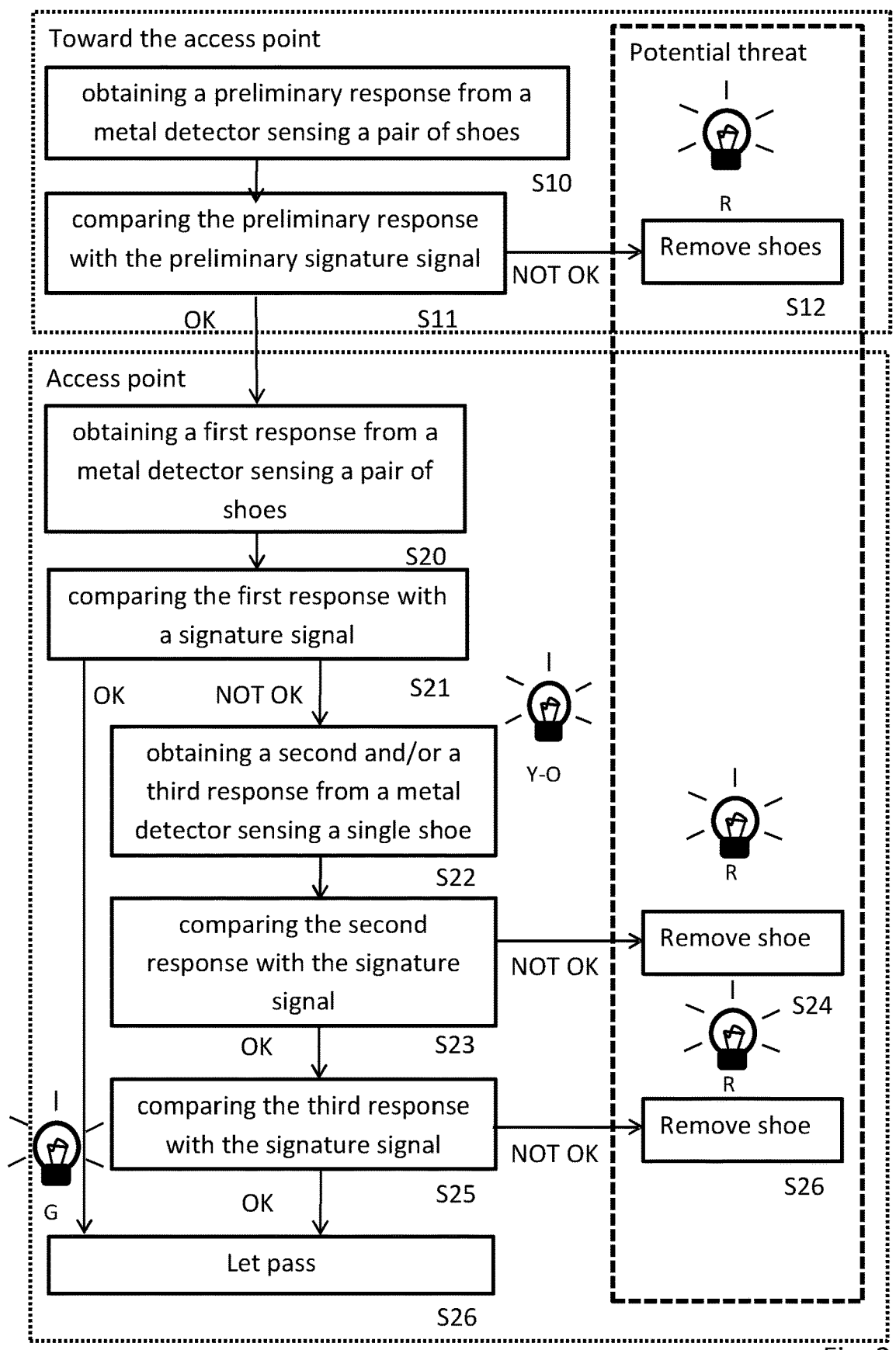
FIG. 2 shows a block diagram of an exemplary method for detecting a potential threat, according to the invention.

FIG. 2 shows a block diagram of an exemplary method for detecting a potential threat in a shoe of an individual wanting to access a restricted access area, according to the invention.

The method comprising steps of:

obtaining a first response provided by a first metal detector 11 by sensing a pair of shoes worn by the individual 2 standing on or walking through the security access point 51 (Step S20);

comparing said first response with a signature signal (Step S21) and, based on the comparison:

obtaining a second response provided by said first metal detector 11 or by a second metal detector 12, 13, by sensing one shoe of said pair of shoes (S22); and detecting a potential threat (S24) by comparing the second response with the signature signal (S23).

The method can also comprises steps of:

obtaining a third response provided by said first metal detector (11), by said second metal detector (12,13) or by a third metal detector (12,13), by sensing the other one shoe of said pair of shoes (S22); and detecting a potential threat (S26) by comparing the third response with the signature signal (S25).

Moreover, said step of detecting a potential threat can comprises a step of comparing the second response with the third response.

The individually scanning of the right and the left shoe can be executed either simultaneously or sequentially, i.e. a shoe after the other, by means of a same or two distinct metal detectors.

Moreover, the second and/or third response can be advantageously obtained while said one shoe and/or said other one shoe is worn by the individual.

The step of detecting a potential threat (can comprises prompting the individual to remove his right and left shoes (S24, S26) for scanning them.

The method can comprises obtaining the signature signal by sensing a shoe comprising a threat with a metal detector or by simulating the effect of a shoe comprising a threat on a metal detector.

The method can comprises a step of allowing (prompting) an individual 2 worn an uncritical pair of shoes (as an outcome of the comparison between the first response and the signature signal) to take an exit path 56 circumventing or bypassing the second and/or third metal detector.

The individual can be prompted and/or allowed by means of displayed messages either with or without a displaying of a coloured luminous signal, notably:

an individual can be prompt to move to the second and/or third metal detector 12, 13 by displaying a warning message with and/or without a displaying of a coloured Yellow/Orange luminous signal;

an individual can be prompt to pass through the security access path by circumventing or bypassing the second metal detector by displaying a go message with and/or without a displaying of a coloured luminous signal, e.g. a green light.

Advantageously, said steps of prompting and/or allowing can comprises a step of displaying or indicating either an indication of a path 57 toward the second metal detector 12, 13, or a path 56 circumventing or bypassing the second metal detector.

Advantageously, the method can comprises a step of pre-scanning the pair of shoes worn by the individual on a path (40) leading to the security access point (51), i.e. before the individual reach the security access point for the first time (i.e. before said step of obtaining a first response).

The pre-scanning comprising:

obtaining a preliminary response provided by a preliminary metal detector (10) by sensing the pair of shoes (S10), and comparing the preliminary response with a preliminary signature signal (S11) for indicating a likely presence of one or more potential threats (S12).

Based on this comparison, the method can also comprise: either prompting the individual to remove his right and left shoes (Step 12); and eventually scanning the unworn right and left shoes by means of the baggage screening system of the security access point; or allowing (prompting) the individual to walk towards the security access point notably by displaying a go message or an indication of a way 40 toward the security access with or without a green luminous signal.

The method can also comprises obtaining the preliminary signature signal by sensing a pair of shoes each comprising a threat with a metal detector or by simulating the effect of a shoe each comprising a threat on a metal detector.

LIST OF REFERENCE NUMERALS

1 Shoe scanning system
10 Preliminary metal detector
101 Display for prompting
102 Colored light source
11 Shoes metal detector
111 Display for prompting
112 Colored light source
12 Single shoe metal detector
121 footprint
13 Single shoe metal detector
131 footprint
14 Processing unit
2 Individual
21 Right shoe
22 Left shoe
25 Baggage
40 Path toward a security access point
41 Baggage deposit area
50 Restricted access area
51 Security access point
52 X-ray detection system
521 Conveyor belt of the X-ray detection system
53 Full-body metal-detecting portal
54 Full-body scanner
55 Pass-through path
56 Free exit path
57 Threat controlling path
6 Assistant of security access point
G, Y-O, R Green, Yellow/Orange, and Red light
S10-S26 Steps of the method for detecting a potential threat within a shoe

The invention claimed is:

1. A method for detecting a threat in a shoe worn by an individual accessing a restricted access area through a security access point, the method comprising steps of:

obtaining a first response provided by a first metal detector sensing conjointly and cumulatively a pair of shoes worn by the individual standing on or walking through the security access point;

detecting a critical pair of shoes by comparing said first response with a predefined signature signal representing a pair of shoes comprising a threat or an object representing a threat; and in response of a comparison indicating the critical pair of shoes:

prompting the individual to place the critical pair of shoes at a first and second predefined position with respect to a second and to a third metal detector;

obtaining a second and a third response provided by respective second and third metal detectors sensing respectively one and the other of the critical pair of shoes at said first and second predefined positions; and
detecting a potential threat for each shoe of said pair of shoes by comparing the second and third responses with given threshold.

2. The method according to claim 1, wherein said predefined position is a portion of surface on which the individual can stand.

3. The method according to claim 2, wherein said portion of surface is indicated by a mark;
preferably said mark being a circle, a cross, or a footprint.

4. The method according to claim 1, wherein the first metal detector is placed under a surface on which the individual has to stay or walk for accessing the restricted access area.

5. The method according to claim 1, comprising obtaining the signature signal by sensing a shoe comprising a threat with a metal detector or by simulating the effect of a shoe comprising a threat on a metal detector.

6. The method according to claim 1, wherein said steps of detecting a potential threat comprises:
comparing the second response with the third response.

7. The method according to claim 1, wherein the second and/or third response are obtained while said one shoe and/or said another shoe is worn by the individual.

8. The method according to claim 1, further comprising:
pre-scanning the pair of shoes on a path leading to the security access point; this pre-scanning comprising:
obtaining a preliminary response provided by a preliminary metal detector by sensing the pair of shoes, and
comparing the preliminary response with a preliminary signature signal for indicating a likely presence of one or more potential threats.

9. The method according to claim 8, wherein said step of comparing the preliminary response with the preliminary signature signal comprises:
allowing the individual to walk towards the security access point; or
prompting the individual for scanning his pair of shoes with a baggage screening system of the security access point.

10. The method according to claim 8, comprising obtaining the preliminary signature signal by sensing a pair of shoes each comprising a threat with a metal detector or by simulating the effect of a shoe each comprising a threat on a metal detector.

11. The method according to claim 8, wherein the preliminary response is obtained while said pair of shoes is worn by the individual.

12. The method according to claim 1, wherein said step of obtaining a second response comprises:
displaying a warning message with and/or without a displaying of a coloured luminous signal; and/or
prompting the individual to move to the second metal detector; and/or
indicating a path to the second metal detector.

13. The method according to claim 1, wherein the second response provided by the second metal detector, and wherein the third response is provided by the second or by the third metal detector being spatially separated from the first metal detector.

14. A system for scanning an individual before access to a restricted access area, configured to execute the method according to claim 1.

15. The system according to claim 14, comprising: an indication arrangement for providing instructions to the individual, directly or through an assistant; and a processing system is configured to, in response of a comparison indicating the critical pair of shoes, control the indication arrangement for: displaying the warning message with and/or without the displaying of a coloured luminous signal; and/or prompting the individual to move to the second metal detector; and/or indicating the path to the second metal detector.

16. The system according to claim 14, wherein the processing unit is configured to control the indication arrangement for:
prompting the individual to remove his right and left shoes and to place them onto a conveyor of a baggage screening system.

17. The system according to claim 14, wherein a preliminary metal detector is located under a surface of the path leading to the security access point;
preferably near a conveyor of the baggage screening system.

18. The system according to claim 14, comprising a full body metal detector comprising the first metal detector.

19. The system according to claim 14, comprising a full-body scanner comprising the second and/or a third metal detector.

20. The method according to claim 1, wherein said given threshold corresponds to said predefined signature signal.

* * * * *